US011313571B2

(12) United States Patent
Patel et al.

(10) Patent No.: US 11,313,571 B2
(45) Date of Patent: Apr. 26, 2022

(54) PTAC UNIT WITH DYNAMIC INTELLIGENT AIR MANAGEMENT SYSTEM AND METHOD OF USE

(71) Applicants: Henry I. Patel, Lubbock, TX (US); Aviraj H. Patel, Lubbock, TX (US); Niraj H. Patel, Lubbock, TX (US)

(72) Inventors: Henry I. Patel, Lubbock, TX (US); Aviraj H. Patel, Lubbock, TX (US); Niraj H. Patel, Lubbock, TX (US)

(73) Assignee: Prem Industries, LLC, Lubbock, TX (US)

( * ) Notice: Subject to any disclaimer, the term of this patent is extended or adjusted under 35 U.S.C. 154(b) by 147 days.

(21) Appl. No.: 16/806,663

(22) Filed: Mar. 2, 2020

(65) Prior Publication Data

US 2020/0278128 A1 Sep. 3, 2020

Related U.S. Application Data

(60) Provisional application No. 62/812,403, filed on Mar. 1, 2019.

(51) Int. Cl.
| | |
|---|---|
| *F24F 11/30* | (2018.01) |
| *F24F 1/027* | (2019.01) |
| *F24F 5/00* | (2006.01) |
| *F24F 1/037* | (2019.01) |
| *F24F 1/0375* | (2019.01) |
| *F24F 1/035* | (2019.01) |

(52) U.S. Cl.
CPC .............. *F24F 11/30* (2018.01); *F24F 1/027* (2013.01); *F24F 1/035* (2019.02); *F24F 1/037* (2019.02); *F24F 1/0375* (2019.02); *F24F 5/0085* (2013.01)

(58) Field of Classification Search
CPC ........ F24F 1/008; F24F 1/0353; F24F 1/0093; F24F 2110/50; F24F 1/027; F24F 1/0375; F24F 1/035; F24F 1/037
See application file for complete search history.

(56) References Cited

U.S. PATENT DOCUMENTS

| | | | |
|---|---|---|---|
| 3,666,002 A | 5/1972 | Ferdelman | |
| 4,478,048 A * | 10/1984 | Dills ....................... | F24F 1/027 |
| | | | 62/126 |
| 4,552,058 A * | 11/1985 | Wooldridge ............. | F24F 11/75 |
| | | | 454/238 |
| 5,992,160 A | 11/1999 | Bussjager et al. | |
| 6,009,716 A | 1/2000 | Aoto et al. | |
| 7,628,026 B1 | 12/2009 | Kritsky et al. | |
| D618,777 S | 6/2010 | Kritsky | |
| 8,757,506 B2 | 6/2014 | Zhou et al. | |

(Continued)

*Primary Examiner* — Schyler S Sanks
(74) *Attorney, Agent, or Firm* — Monty L Ross PLLC; Monty L. Ross

(57) ABSTRACT

A refrigerated air conditioning unit partitioned into an inside plenum and an outside plenum and having a single refrigeration loop, a single evaporator, and a recirculated air stream, the unit also having a dynamic intelligent air management system (DIAMS) internal to the unit that is cooperatively configured and operable to continuously introduce preconditioned fresh air directly into the recirculated air stream whenever the unit is operating and to exercise control over a mixed air flow discharged from the unit into an identified space to achieve a desired air temperature and humidity within the identified space.

1 Claim, 5 Drawing Sheets

(56) References Cited

U.S. PATENT DOCUMENTS

| | | | |
|---|---|---|---|
| 9,383,115 | B2 | 7/2016 | Siegel et al. |
| 9,696,044 | B2 | 7/2017 | Shaffer et al. |
| 2005/0145109 | A1* | 7/2005 | Dancey ............... F24F 1/04 95/273 |
| 2005/0224591 | A1* | 10/2005 | Wolfson ............. F24F 11/70 236/49.3 |
| 2006/0035580 | A1 | 2/2006 | Anderson et al. |
| 2006/0175038 | A1* | 8/2006 | Liu ................... F24F 1/0063 165/8 |
| 2007/0181000 | A1* | 8/2007 | Wilson ............... A61L 9/014 96/134 |
| 2008/0051024 | A1 | 2/2008 | Caliendo et al. |
| 2008/0148749 | A1 | 6/2008 | Ishida |
| 2008/0230619 | A1 | 9/2008 | Kirby |
| 2010/0083682 | A1* | 4/2010 | Koehler ............ F24F 11/0001 62/262 |
| 2011/0308265 | A1* | 12/2011 | Phannavong ....... F24F 12/001 62/160 |
| 2012/0312520 | A1* | 12/2012 | Hoke ............... B60H 1/00285 165/203 |
| 2012/0322353 | A1* | 12/2012 | Christopherson ...... F24F 7/00 454/56 |
| 2014/0259977 | A1* | 9/2014 | McDonald ........ E04B 1/34815 52/79.5 |
| 2014/0330438 | A1 | 11/2014 | Haines et al. |
| 2016/0327287 | A1* | 11/2016 | Sprayberry ........... F24F 3/048 |
| 2017/0176027 | A1* | 6/2017 | Eicher ............... F24F 13/222 |

\* cited by examiner

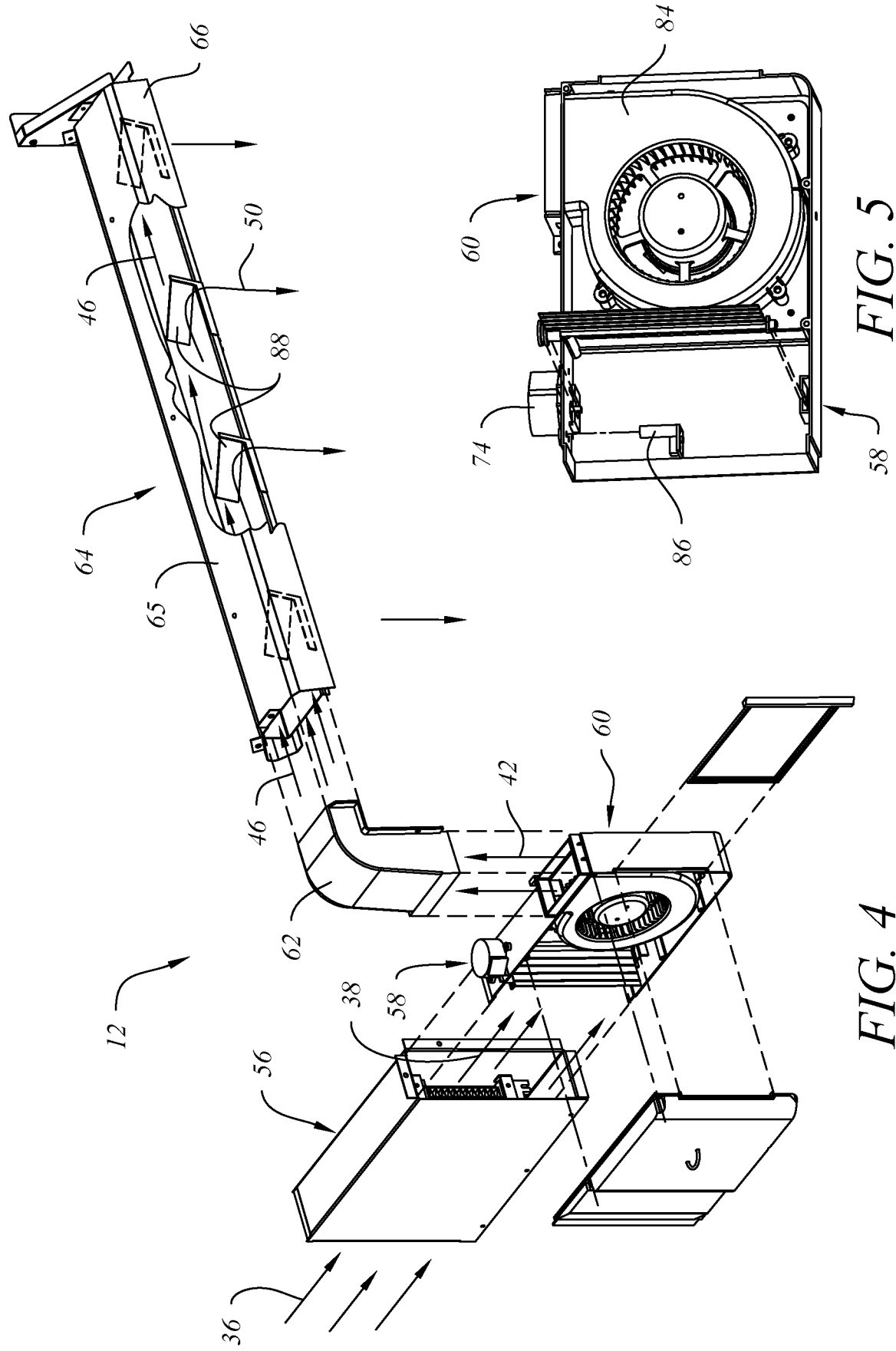

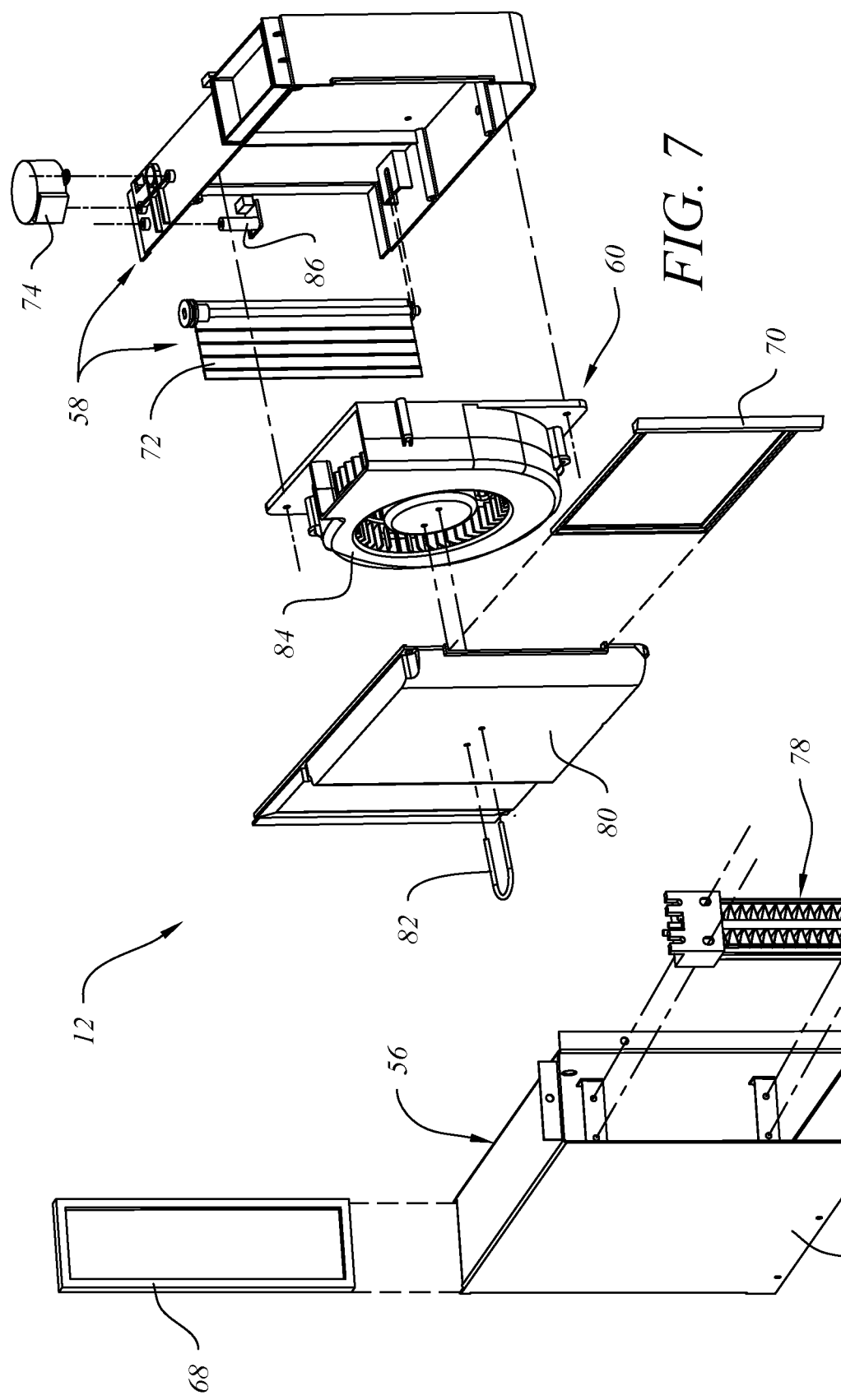

PTAC UNIT WITH DYNAMIC INTELLIGENT AIR MANAGEMENT SYSTEM AND METHOD OF USE

1. FIELD OF THE INVENTION

This invention relates to a dynamic, intelligent air management system (DIAMS) and associated methods of use in air conditioning units and, more particularly, as one preferred embodiment, in packaged terminal air conditioner (PTAC) units. The subject invention includes components, operational modes and control parameters providing improved temperature and humidity control, filtration and air flow management that are cost effective and demonstrate improved safety and performance, energy reduction, maintenance access and sound attenuation over prior art devices. The subject invention is also believed to have broader applicability to vertical terminal air conditioner (VTAC) units and to similarly configured split and unitary systems.

2. DESCRIPTION OF RELATED ART

PTAC units are perhaps best known for their widespread applicability as self-contained in-room heating and air conditioning units that are typically mounted in an opening located beneath one or more windows in an outside wall of a relatively small interior space. The interior space often consists of a bedroom or sleeping space, bathroom and closet that are primarily intended for short- or medium-term occupancy by one or two persons. Such interior spaces are frequently located in a low-rise, multi-unit building such as, for example, a small- to medium-sized hotel, nursing home, assisted living or memory care facility, or the like, and provide a relatively inexpensive and effective way for an individual occupant or couple to manage air temperature and humidity within a relatively limited physical space.

A conventional PTAC has a housing containing a closed loop refrigeration system including a refrigerant, compressor, condenser, expansion device and evaporator that are operated according to a conventional cooling cycle. A transverse partition divides the interior volume of the housing into separate "inside" and "outside" plenums, each having a motor-driven fan with an intake side and a discharge side. For conventional cooling with refrigerated air, the expansion device and evaporator are disposed in the inside plenum and a compressor and condenser are disposed in the outside plenum. Conduits are provided to contain the refrigerant as it flows through the various components and through the partition at different temperatures, pressures and physical states (vapor or liquid). Because PTAC units are mounted in a wall and have a partition extending transversely across the interior space of the unit, they typically provide some reduction in the outside noise transmitted through the unit and into the air conditioned space, although other factors such as motors, fan speeds and the like also contribute to the overall noise level of the unit.

When a conventional PTAC unit is operated in a cooling mode, a motor-driven fan located in the outside plenum draws ambient outside air into the outside plenum and blows it through the condenser coils (downstream of the compressor) before discharging it back outside. As the air passes through the condenser, it transfers heat transferred from hot, compressed refrigerant to the outside air, which is then directed through an outlet vent and back into the ambient outside air. At the same time, another motor-driven fan located in the inside plenum draws warm room air into the inside plenum through the evaporator coils (downstream of the expansion device), thereby transferring heat from the room air to the cold liquid refrigerant circulating inside the coils and then discharges the cooled air through an outlet vent and back into the room. A conventional control system typically turns the refrigeration system and fans "on" and "off" either manually or automatically (through use of a thermostat) whenever the air temperature inside the room reaches a desired or predetermined level. In some PTAC units, the inside fan can be operated to recirculate inside air even when the refrigeration system is turned off. This mode of operation does not cool the inside air but creates "white noise" that is considered desirable (particularly for sleeping) by some occupants. U.S. Pat. No. 6,009,716 discloses an "integral type air conditioner" comprising an interior heat exchanger and motor and an outside heat exchanger and motor. The motor for the fan (or blower) for the inside plenum is installed in the outside plenum and is operatively coupled to the fan for the inside plenum through a partition between the inside and outside plenums to keep the fan motor noise behind the partition and reduce the sound level on the room side of the unit. U.S. Pat. No. 9,383,115 discloses a "fresh air ventilation device" mounted as an external component to a side wall of the in-room portion of a PTAC and has its own external fresh air plenum. Air filters are typically provided in PTAC units but such filters are often positioned where they can be serviced only from outside the building or by removing a cover of a housing inside the room where the unit is installed.

When heating is desired in a room equipped with a conventional PTAC, electrical resistance heating elements are typically used to warm the flow of room air as it is recirculated by the fan or blower located in the inside plenum. More recently, some PTAC units have been disclosed that are configured to operate in a "heat pump" mode. PTAC units configured to operate as heat pumps are typically more expensive to purchase but can be operated less expensively than PTAC units that rely solely upon electrical resistance heating during cold weather. When operating in a "heat pump" mode, the refrigeration cycle is reversed and the closed loop system is configured so that it can blow hot air into the room instead of outside. This allows the unit to function as a heater in the winter and as an air conditioner in the summer, but efficiencies are reduced in colder climates where heat is being removed from outside air that is significantly cooler than the inside air into which the heat is being transferred.

Other safety and operational issues related to performance of the conventional PTAC units have also been identified at various times, particularly where the PTAC units are installed in warm, high humidity environments and operated with either no or insufficient makeup air. U.S. Pat. No. 5,992,160 identifies problems previously associated with "sick buildings" that have been overcooled in an effort to lower humidity and have experienced stale and stagnant air. U.S. Pat. No. 7,628,026 discloses that such operational issues often include the formation of mildew and mold on interior and in-wall surfaces, which are largely attributable to the inability of conventional PTAC units to draw, clean, dehumidify and precondition a continuous stream of fresh air from outside the room prior to introducing it into the recirculated inside air. U.S. Pat. No. 8,757,506 describes the prior use of electric heaters to "reheat" overcooled buildings and discloses a PTAC system with a controller that enables the system to dehumidify the air in a room without relying on a humidistat and without having to operate the system's compressor and electric heater at the same time. The disclosed system is said to provide a dehumidification mode without using a humidity sensor by closing the outside air damper, decreasing the speed of the supply air fan, and effectively lowering the set point temperature.

Some manufacturers have attempted to solve the problems mentioned above by installing a separate dehumidification system for dehumidifying makeup air inside a PTAC. U.S. Pat. No. 5,992,160 discloses the use of auxiliary refrigerant circuit (also referred to as an "energy recovery unit") including a compressor, condenser, expansion device and an evaporator that is primarily designed to operate in a conventional closed circuit manner to cool air passing through the evaporator and can also be used as a heat pump to warm the air passing through the evaporator (which functions as a condenser when operating in a heat pump mode). U.S. Pat. No. 7,628,026 discloses a potential solution to the problem through use of PTAC units having a second evaporator coil. U.S. Pat. No. 9,696,044 discloses use of an additional refrigeration circuit comprising an additional compressor, condenser, evaporator, expansion device and dryer. U.S. D618,777 discloses a similar unit as "an insert" for a PTAC.

A PTAC unit is therefore needed that is designed and configured to be entirely self-contained within the side walls of the housing; to provide a continuous, separate source of preconditioned fresh air at a variable flow rate whenever the unit is operating; to direct and distribute preconditioned fresh air across the width of the inside heat exchanger; to premix preconditioned fresh air with recirculated air upstream of the inside exchanger; and to control temperature and humidity in an identified indoor space through the use of a single refrigeration loop and evaporator, indoor and outdoor humidity sensors and a programmable digital controller to introduce preconditioned fresh air at a variable flow rate.

SUMMARY OF THE INVENTION

As used in the disclosure, "DIAMS" refers to apparatus and control elements internal to an air conditioner, preferably a PTAC unit, that are cooperatively configured and operated to precondition the fresh air and to exercise control over the total combined air flow discharged into a room or other identified interior space ("identified space") to achieve a desired air temperature and humidity within the space. More particularly, the DIAMS is desirably configured and operated to control temperature and humidity in an identified indoor space through the use of a single refrigeration loop and evaporator, and to continuously introduce preconditioned fresh air into the recirculated air stream whenever the unit is operating. As discussed in greater detail below, temperature and humidity sensors are desirably positioned to sense and communicate the temperature and humidity level of the incoming fresh air stream and of the recirculated air stream within the identified space to a digital controller. The digital controller is desirably programmed to select and implement a desired operational configuration for the PTAC unit in response to the sensed temperature and humidity parameters in relation to targeted "set points." The targeted humidity set points are desirably preprogrammed into the digital controller and the targeted temperature set point for the recirculated air can be preprogrammed or manually set by an individual from the display panel on the front of the unit.

As used in this disclosure, "fresh air" or "makeup air" means ambient air drawn into an air conditioner such as a PTAC unit from outside a building in which the unit is installed. The fresh air is desirably drawn through an inlet port into a fresh air duct located entirely inside the unit and is maintained separate and apart from other sources or air streams until such time as it is discharged into the inside plenum of a PTAC unit to be intermixed with a stream of recirculated air. "Recirculated air" means air received into a PTAC unit from inside an identified space in which the unit is installed.

The volume of the fresh air stream introduced into an identified space through the fresh air duct is primarily controlled by the rotational speed of a fresh air blower disposed inside the fresh air duct. The fresh air blower is desirably always operating whenever the air conditioning unit is in use, so a damper located between the fresh air inlet and the fresh air blower is normally open as well to allow fresh air to reach the suction side of the fresh air blower. When the fresh air blower is not operating, the damper is desirably closed to prevent noise, dust and other airborne debris from entering the identified space through the fresh air duct. In one embodiment of the present invention, the damper is desirably opened and closed by an electric motor that is activated by the digital controller of the DIAMS. Preferably, the damper is either fully open or fully closed so that the volumetric flow rate (typically expressed as cubic feet per minute or "cfm") is controlled by the speed of the fresh air blower rather than by controlling the degree to which the damper is opened or closed It is noteworthy that the damper can be opened and the fresh air blower can be operated when the refrigeration loop is not operating. One circumstance, for example, when this might occur is when the outside temperature is lower than the set point temperature for the recirculated air and the room temperature is above the set point. In this circumstance the room can be cooled down to the temperature set point by introducing preconditioned fresh air without operating the refrigeration loop.

As used in this disclosure, "preconditioned fresh air" means a stream of fresh air that has been filtered or otherwise treated inside a fresh air duct to favorably adjust one or more physical or chemical properties of the fresh air before it is distributed across and discharged from the fresh air duct into the inside plenum of an air conditioner such as a PTAC unit. One aspect of preconditioning the fresh air stream is filtration and purification. As used in this disclosure, "filtration and purification" can include a wide range of technologies intended for use in removing particulate matter such as, for example and without limitation, dust, pollen and other allergens, as well as organic matter, microbes, viruses and fungi such as mold spores. The fresh air stream can be filtered and, if desired, purified while inside the fresh air duct using various combinations of materials, methods, techniques and devices including, for example: activated carbon, fiberglass, or cotton filters; ultrafiltration; electrostatic precipitation; ultraviolet sterilization; and the like. In one embodiment of the invention, fresh air is filtered once when entering the air duct (by a filter that is easily accessed from outside) and a second time downstream of the damper on the suction side of a variable speed fresh air blower mounted inside the fresh air duct (by a filter that is easily accessed from inside an identified space).

Another aspect of preconditioning the fresh air is "preheating" that is used, for example, when the ambient outside air temperature is lower than a desired target temperature (or set point temperature) inside an identified space. As with filtration, preheating can be done at each of one or more locations inside the fresh air duct by activating a "preheater" having an appropriately sized and configured heat source, preferably having electrical resistance heating elements, to preheat the fresh air stream passing through the fresh air duct at the flow rates, temperatures and humidity levels for which a particular PTAC unit is designed. The fresh air stream can be preheated together with or independently of any heating capability that is provided as part of the air conditioning unit. In a cold environment, fresh air is desirably preheated before combining it with recirculated air or otherwise introducing it into an identified space. With the system and method disclosed here, these objectives are achieved using the single evaporator typically provided in a PTAC or other similarly configured air conditioning unit.

Another aspect of fresh air preconditioning that can also increase the comfort level and safety of an occupant in an identified indoor space is controlling the total moisture intake through use of the DIAMS to adjust the relative humidity of the room air. When the inside humidity is uncomfortably low and the humidity of the outside air is higher, the inside humidity level can be increased by introducing fresh air through the fresh air duct and then mixing it with the recirculated air. Conversely, when the inside humidity is uncomfortably high and the outside humidity is lower, the inside humidity level can be decreased by introducing fresh air through the fresh air duct and then mixing it with the recirculated air. Alternatively, if the relative humidity is uncomfortably high both inside and outside an identified space, the damper can remain open and the refrigeration loop can be used to lower the humidity.

Other examples of preconditioning for the fresh air stream can include, for example and without limitation, odor control, fragrance injection, humidification (for locales having extremely low humidity or a high level of static electricity), and the like.

The maximum fresh air flow rate for a particular fresh air duct can depend, for example, upon factors such as the length, cross-sectional area and configuration of the fresh air duct, the pressure drop through the fresh air duct, the blower speed(s) and impeller design, and will also take into consideration factors such as the overall BTU ("British Thermal Unit") rating and throughput for the PTAC unit as a whole. In one embodiment, the rated volumetric throughput of the fresh air duct will range from about four percent (4%) percent up to about fourteen percent (14%) or more of the rated volumetric throughput of the PTAC unit.

According to one embodiment of the invention, an air conditioning unit embodying the DIAMS as disclosed here can be selectively operated in any of the following modes, each of which is discussed in greater detail below: fresh air control; humidity control; and heat recovery venting (HRV).

BRIEF DESCRIPTION OF THE DRAWINGS

The apparatus of the invention is further described and explained in relation to the following drawings wherein:

FIG. 4 is an exploded front perspective view as in FIG. 3, also diagrammatically depicting stream lines associate with the flow of fresh air through the DIAMS;

FIG. 5 is an enlarged rear perspective view of a section of the fresh air duct with the side panel removed, taken and modified from FIG. 4 to reveal one embodiment of a temperature and humidity sensor, damper and fresh air blower of the invention;

FIG. 6 is an enlarged, exploded front perspective view of the inlet section of a fresh air duct, taken from FIG. 4, with the fresh air inlet filter and the fresh air preheater exploded from the inlet section in which they are located in one embodiment of the invention; and FIG. 7 is an enlarged, exploded front perspective view of the fresh air blower section of the fresh air duct of one embodiment of the invention.

It should be understood and appreciated that the accompanying drawings are simplified in some cases for illustrative purposes and are not drawn to scale.

DETAILED DESCRIPTION OF AN EMBODIMENT

Figure 1:
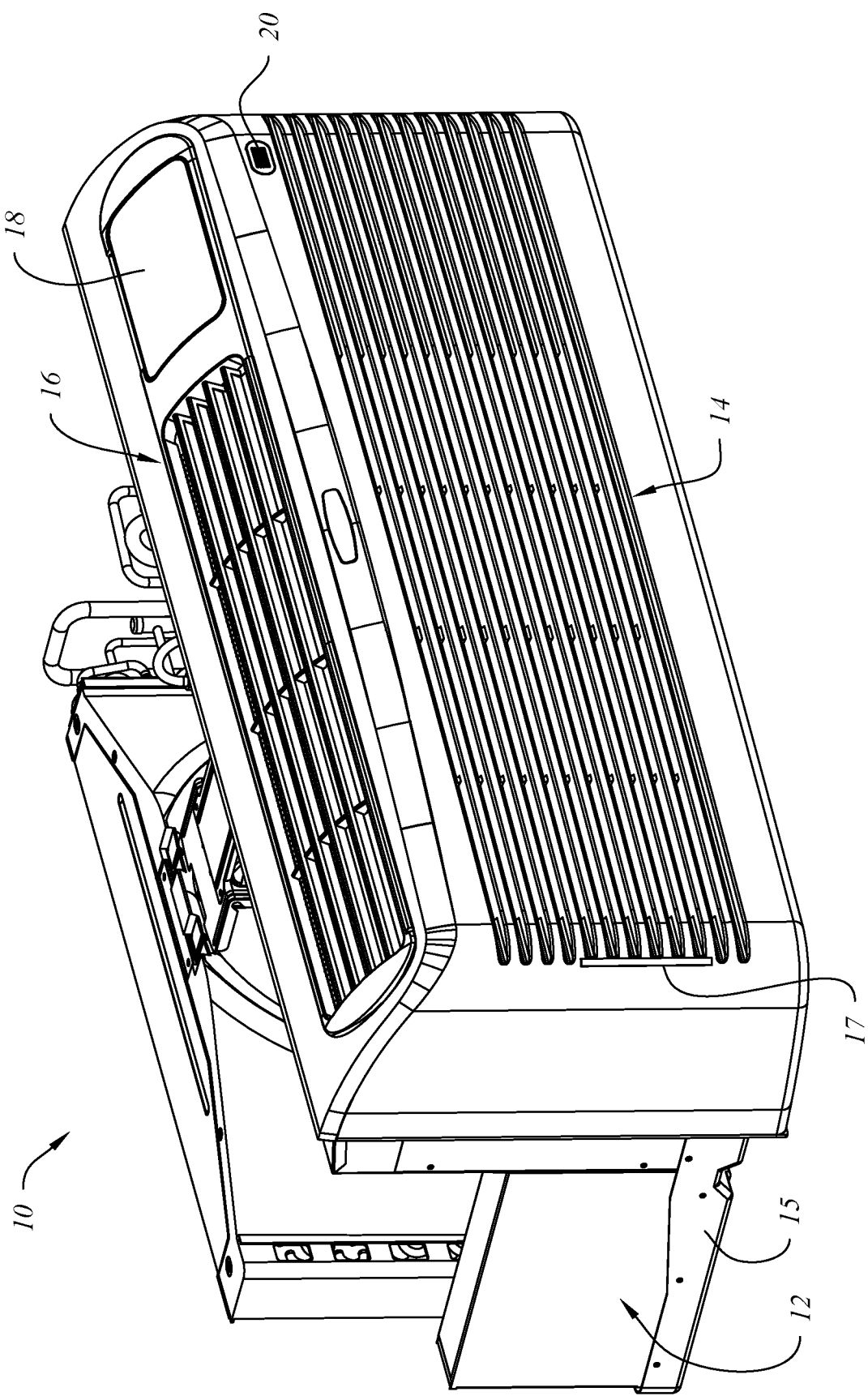
FIG. 1 is a front perspective view of a PTAC (rear cover removed) configured in accordance with one embodiment of the present invention.

The structure and operation of one satisfactory embodiment of the invention is further described and explained in relation to FIGS. 1-7 of the invention. Referring to FIG. 1, PTAC 10 has a single refrigeration loop and one evaporator, and is depicted with DIAMS 12 of the invention installed internally to PTAC 10 and the rear cover removed. DIAMS 12 is supported in part by frame member 15 and by transverse partition 24 (visible and further identified in FIG. 2). PTAC 10 further comprises a front cover having an inlet grill 14 configured to receive recirculated air from an identified interior space and an upwardly and outwardly directed set of discharge vents 16 through which a mixture of preconditioned fresh air and recirculated air are discharged back into the identified space. Temperature and humidity sensor 20 is provided to sense the temperature and humidity of air inside the identified space and communicate the information to a digital controller desirably underlying and linked electronically to display panel 18, which is preferably a user-interactive touch pad.

Figure 2:
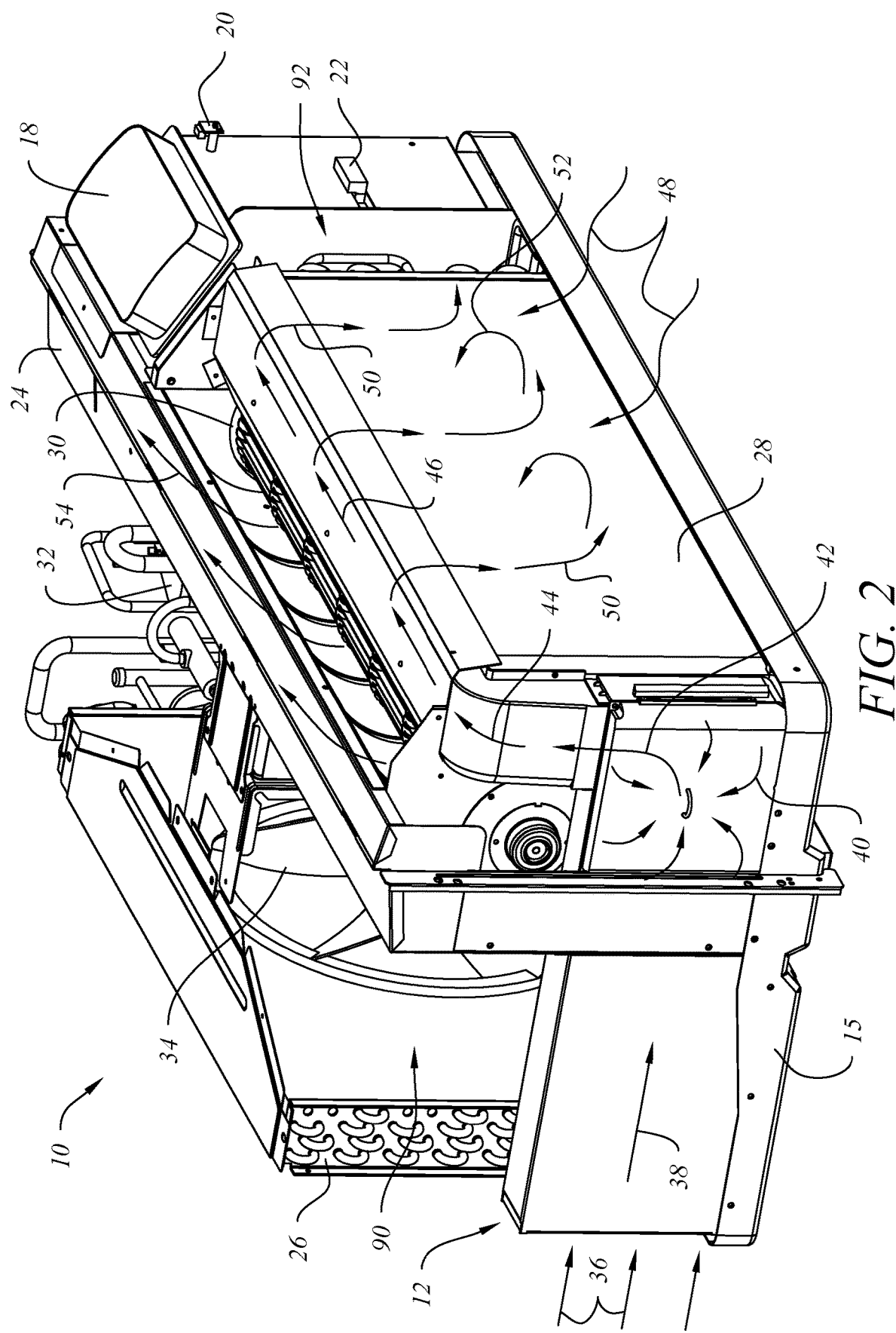
FIG. 2 is a front perspective view as in FIG. 1 with the front cover also removed.

Referring to FIG. 2, the front cover is removed and various components of DIAMS 12 that are internal to PTAC unit 10 are more visible. In addition to components previously identified above in relation to FIG. 1, PTAC 10 incorporates DIAMS 12 and other parts of a single loop refrigeration system as might be present in a conventional PTAC unit or in another similarly configured refrigerated air conditioning unit. For example, outside plenum 90 contains outside exchanger (condenser) 26, compressor 32 and fan 34, which are separated from inside plenum 92 by transverse partition 24. Inside plenum 92 contains inside exchanger (evaporator) 28 and horizontally mounted, recirculated air blower 30 that draws recirculated room air into the unit as indicated by arrows 48 to be passed by or through inside exchanger 28 before being discharged back into the indicated interior space as shown by laterally spaced apart arrows 54.

Now referring to FIG. 2 in conjunction with FIGS. 3-7, arrows 36 indicate a fresh air stream being drawn into DIAMS 12 from outside PTAC unit 10 into fresh air inlet section 56 of the fresh air duct. In general terms, the "fresh air duct" comprises as its constituent parts (best seen in FIGS. 3, 4) inlet section 56, damper section 58, fresh air blower section 60, and preconditioned fresh air redirection and distribution guide 64. Preconditioned fresh air redirection and distribution guide 64 further comprises air redirection guide 62, lateral air guide 65, lateral air deflector 66 and air limiter 67.

Figure 3:
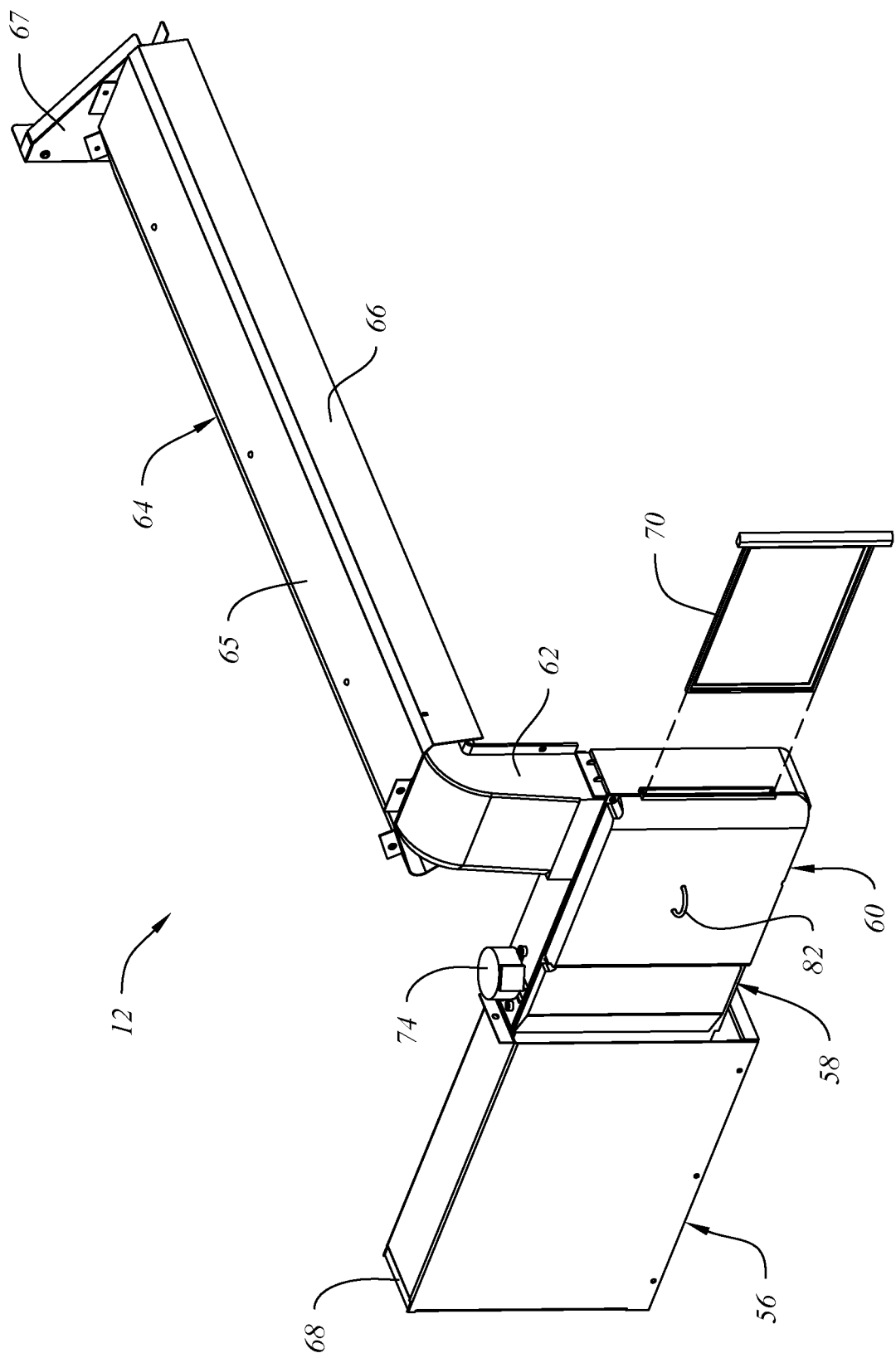
FIG. 3 is a front perspective view depicting an embodiment of the fresh air duct of the DIAMS in accordance with one embodiment of the invention with a fresh air filter exploded forwardly as it would be if removed for cleaning, replacement or other servicing.

As the fresh air stream enters inlet section 56 it is first preconditioned by passing through filter 68 that slidably engages the rear portion of inlet section 56 and is easily serviceable from outside. The filtered fresh air stream is then directed forwardly through inlet section 56 as indicated by arrow 38 past electrical preheater 78 (FIG. 6) and through damper section 58 containing pivotable damper 72 controlled by motor 74 (FIGS. 3, 7). Because damper 72 is open whenever fresh air blower 84 (FIGS. 5, 7) is drawing fresh air into inlet section 56, the filtered and preheated fresh air stream is then drawn into the suction side of fresh air blower 84 disposed inside fresh air blower section 60. As best seen in FIGS. 5, 7, damper section 58 also comprises temperature and humidity sensor 86, which senses and electronically communicates to the digital controller preferably underlying display panel 18 the temperature and humidity of the fresh air stream entering blower section 60.

Preconditioned fresh air redirection and distribution guide 64 is provided to redirect and distribute preconditioned fresh air being discharged from fresh air blower section 60 into and through air redirection guide 62 as indicated by stream lines 42, 44 and then laterally through lateral air guide 65 in a substantially horizontal flow path across the width of inside plenum 92 above inside exchanger 28 as shown by arrows 46. Referring to FIGS. 2-4, lateral air guide 65 preferably further comprises a plurality of laterally spaced, angularly disposed baffles 88 (FIG. 4) that assist in distributing, balancing and redirecting the preconditioned fresh air stream passing through lateral air guide 65 across the width of the recirculating air stream and against lateral air deflector 66 to deflect the distributed and balanced air flow downwardly through into the front section of inside plenum 92 as indicated by arrows 50. In so doing, the preconditioned air stream travels through at least two substantially perpendicular changes in flow direction after being discharged from blower section 60. Introducing preconditioned fresh air downwardly into the front section of inside plenum 92 (arrows 50) promotes intermixing of the preconditioned fresh air (arrows 50) and recirculating air streams (arrows 48 entering the unit from the identified space through front cover inlet grill 14 of FIG. 1) before being drawn into the suction side of horizontally disposed blower 30 as indicated by arrows 52. As shown in FIG. 2, as the intermixed streams of preconditioned fresh air and recirculating air pass through inside plenum 92, they are cooled or heated by inside exchanger 28, depending upon the operational mode of PTAC 10, after which intermixed air stream 52 passes through and is discharged by blower 30 back into the identified space as indicated by arrows 54 shown in FIG. 2.

Referring to FIGS. 6 and 7, air filter 68 and fresh air preheater 78 are preferably disposed inside housing 76 of inlet section 56 and stabilizer 82 desirably secures side panel 80 to the drive motor housing disposed inside blower 84 of fresh air blower section 60. A second fresh air filter 70 slidably engages a slot provided behind side panel 80 to facilitate insertion and removal of air filter 70 for servicing from inside the identified space.

The logic preprogrammed into a digital controller provided as part of DIAMS 12 and underlying interactive display or "touch pad" 18 of PTAC 10 is desirably configured to receive data from temperature and humidity sensors 20, 86 and use that data to determine a preferred mode of operation of PTAC 10 as set forth below. Appropriate electronic instructions are then communicated to damper motor 74 and to motor-driven blower 84 as well as to display 18 and to the other control elements of PTAC 10 as needed to implement the preferred mode of operation to achieve a desired temperature and humidity level with the identified space within which PTAC 10 is installed. An example of satisfactory control protocols and operational sequences for modes of operation of DIAMS 12 as installed in PTAC 10 including: fresh air control in "heat mode", "cool mode" or "fan mode" configurations; humidity control; and heat recovery venting is set forth below:

Example

DIAMS Control

When a switch on the digital controller is ON, it allows the touch pad button to turn on/off the DIAMS system.

Fresh air intake consists of 3 variable speed settings of: Low, Mid and High for the fresh air blower.

"OD" designates "outdoor" and "ID" designates "indoor."

"Temp" designates temperature and "Hum" designates humidity.

"RH" designates relative humidity.

"Comfort" refers to a level that is presumed to be reasonably comfortable to an occupant of an identified space in which the DIAMS unit is installed.

Logic:
1) Cool mode:
    1. OD temp.<mid zone, fresh air blower runs at High.
        (If OD-Hum is above comfort RH, fresh air blower run at Mid; If RH high above comfort RH, fresh air blower runs at Low)
    2. OD Temp.=>mid zone, fresh air blower runs at Mid.
        (If OD-Hum is below Low RH, fresh air blower runs at High. If above comfort RH, fresh air blower runs at Low.)
    3. OD Temp.=>high zone, fresh air blower runs at Low.
        (If OD-Hum is below Low RH, fresh air blower runs at High; If above comfort RH, fresh air blower runs at Low.)
    4. OD Temp.=>very high zone, fresh air blower runs at Low.
2) Heat mode:
    1. OD Temp.<Very Low, fresh air blower off, but damper remains open to admit minimal flow of fresh air drawn into unit by suction of main blower.
    2. OD Temp.<Low, fresh air blower runs at Low.
        (If OD-Hum is above Low RH, fresh air blower runs at Mid.)
    3. OD Temp.=>Low, fresh air blower runs on at Mid.
        (If OD-Hum is above Low RH, fresh air blower runs at High.)
    4. OD Temp.=>Mid, fresh air blower runs at High.
        (If OD-Hum is above comfort RH, Fresh air blower runs at Mid; If high above comfort RH, Fresh air blower runs at Low.)
3) Fan mode:
    1. Fresh air blower runs at High.
        (If OD-Hum is above comfort RH, Fresh air blower runs at Mid, If high above comfort RH, Fresh air blower runs at Low.)

Humidity Control a) ID humidity must be controlled within defined range of % RH for optimal comfort at all time.

b) When ID HUM=>comfort RH, the unit run in dehumidify (Dry) mode.

c) Dehumidify (Dry) mode
    1) ID Fan low speed
    2) Compressor and OD Fan turns on and off at preset intervals, ID fan run in low fan speed continually.

d) When ID HUM=>Low RH, exit dehumidify mode and back to the original preset mode.

Note: if there is a cool demand, unit run until demand fulfilled then enter into dehumidify mode.

Heat Recovery Venting (HRV)

Heat recovery in general terms means the recovery and re-use of unwanted energy. In this case, re-use of energy is the reuse of residue energy left behind in the inside exchanger after the system operates in cooling or heating mode.

Steps of Operation:

1. Unit operates in cooling or heating mode.
2. When unit achieved target value, unit compressor stops operation. Refrigerant in the inside exchanger remains cool or heated.
3. The fresh air system operates, driving fresh intake air from the outside through the inside exchanger, thus recovering and using the residue cool or heat from the indoor coil. We call this "heat recovery venting," utilizing unwanted energy to re-cool or re-heat the identified space.

Those of ordinary skill in the art may, upon reading this disclosure, appreciate that some of the apparatus and control features disclosed here are similarly applicable to vertical packaged air conditioning ("VTAC"), split or other unitary units. Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor and/or Applicant are legally entitled.

What is claimed is:

1. A refrigerated air conditioning unit partitioned into an inside plenum and an outside plenum and having a single refrigeration loop, a single evaporator, and a recirculated air blower operable to produce a recirculated air stream into an identified space whenever the unit is operating, the unit further comprising:

a fresh air duct, a fresh air blower, and a dynamic intelligent air management system (DIAMS) internal to the unit that are cooperatively configured and operable to continuously introduce a preconditioned fresh air stream directly into the recirculated air stream whenever the unit is operating and to exercise control over a mixed air flow discharged from the unit into the identified space to achieve a desired temperature and humidity within the identified space;

wherein the fresh air duct comprises an inlet section, a damper section and a fresh air blower section into which a stream of fresh air is drawn from outdoors by the fresh air blower to be preconditioned and then discharged from the fresh air blower into a preconditioned fresh air redirection and distribution guide to be redirected, distributed and discharged across the width of the inside plenum to intermix the preconditioned fresh air stream with the recirculated air stream, and wherein the damper section of the fresh air duct comprises a damper that is opened fully by a damper motor controlled by a digital controller of the DIAMS and remains open whenever the recirculated air blower is operating to allow the fresh air blower to discharge preconditioned fresh air to be intermixed with the recirculated air stream; and wherein the fresh air duct comprises at least one fresh air filtering apparatus and at least one fresh air purification apparatus; and wherein the at least one fresh air filtering apparatus is located between the damper and the fresh air blower, and is accessible from inside the identified space.

* * * * *